United States Patent [19]

Rooney et al.

[11] Patent Number: 4,575,544
[45] Date of Patent: Mar. 11, 1986

[54] FERRICENIUM SALT CATALYSTS FOR VINYL ETHERS

[75] Inventors: John M. Rooney, Naas, Ireland; Paul Conway, Bury St. Edmunds, England

[73] Assignee: Loctite (Ireland) Ltd., Dublin, Ireland

[21] Appl. No.: 600,627

[22] Filed: Apr. 16, 1984

[51] Int. Cl.[4] ............ C08F 4/52; C08F 4/58; C08F 4/70; C08F 116/14
[52] U.S. Cl. ............ 526/118; 525/274; 526/120; 526/131; 526/171; 526/266; 526/270; 526/285; 526/313; 526/333; 526/332
[58] Field of Search ............ 526/171, 332, 333, 334, 526/118, 120, 131

[56] References Cited

U.S. PATENT DOCUMENTS

| | | | |
|---|---|---|---|
| 3,855,040 | 12/1974 | Malofsky | 156/310 |
| 4,525,232 | 6/1985 | Rooney | 204/159.24 |
| 4,525,553 | 6/1985 | Rooney | 526/120 |

*Primary Examiner*—John C. Bleutge
*Assistant Examiner*—A. H. Koeckert
*Attorney, Agent, or Firm*—Walter J. Steinkraus; Eugene F. Miller

[57] ABSTRACT

A curable composition of a vinyl ether resin and at least one ferricenium salt of the formula:

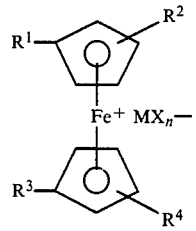

where $R^1$, $R^2$, $R^3$ and $R^4$ are the same or different H or alkyl groups or a linkage to a polymer backbone; M is a metal or metalloid; X is a halide; and n is an integer equal to 1 plus the valency of M.

9 Claims, No Drawings

FERRICENIUM SALT CATALYSTS FOR VINYL ETHERS

BACKGROUND OF THE INVENTION

Numerous methods of polymerizing vinyl ethers are known, including protonic acids, metal halides and stable carbocation salts. References describing cationic cure systems for vinyl ether resins include: U.S. Pat. Nos. 3,196,098; 4,069,056; 4,192,924; and 4,416,752.

In a copending application of the same inventors herein, filed Feb. 21, 1984, Ser. No. 581,857, there are described novel acrylic monomer/peroxy initiator compositions which utilize certain ferrocenium salts as novel polymerization activators. These same ferricenium salts are useful as initiators in the vinyl ether compositions of the present invention.

SUMMARY OF THE INVENTION

The invention is a composition of a vinyl ether resin and at least one ferricenium salt of the formula:

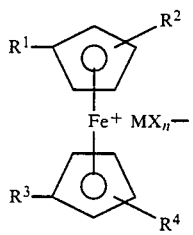

where $R^1$, $R^2$, $R^3$ and $R^4$ are the same or different H or alkyl groups or a linkage to a polymer backbone; M is a metal or metalloid; X is a halide; and n is an integer equal to 1 plus the valency of M.

A further aspect of the invention is a method of making the inventive compositions by generating the ferricenium salt in situ by addition of a trityl salt to a composition of vinyl ether monomer and a ferrocene compound.

A still further aspect of the invention is a method of curing vinyl ether resins by adding a ferricenium salt, as defined above, to a vinyl ether composition. A particularly surprising feature of this aspect of the invention is the fact that while vinyl ethers are known to polymerize only by a cationic method and cationic polymerizations are not known to be sensitive to atmospheric oxygen, the presence or absence of oxygen plays a key role in the polymerization of the inventive compounds. When exposed to atmospheric oxygen the inventive compositions polymerize much more rapidly than they do when steps are taken to minimize or exclude exposure to atmospheric oxygen.

DETAILED DESCRIPTION OF THE INVENTION

The vinyl ether resins useful in the inventive compositions may be represented by the formulas:

$(CH_2=CH-O-CH_2)_n-G$ $(CH_2=CH-O-C_6H_4)_n-G$ $(CH_2=CH-O-CR^1=CR^2)_n-G$ $CH_2=CH-O-C\equiv C)_n-G$ or ketene acetals such as those of the formulas:

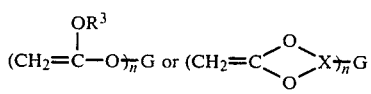

where G is a mono or multivalent radical free of groups, such as amino, substituted amino or phenol, which interfere with cationic or free radical polymerization; n is an integer greater than or equal to 1; $R^1$ and $R^2$ are selected from H, alkyl, substituted alkyl, aryl, and substituted aryl; $R^3$ is selected from alkyl, substituted alkyl, aryl, and substituted aryl; and X is a hydrocarbonyl group of 1-5 carbon atoms. In general, the inventive compositions will contain a substantial proportion of polyfunctional vinyl ether resins in order to produce solid cured products.

Ferricenium salts may be derived from the ferrocene or alkyl substituted ferrocenes such as n-butyl ferrocene, t-octyl ferrocene 1,1'-dibutyl ferrocene, and poly(vinyl ferrocene). A variety of methods for generating ferricenium salts from ferrocenes are known in the art. One useful method of generation is to add a trityl salt, such as triphenyl hexachloroantimonate, to ferrocene dissolved in a suitable solvent.

The trityl salt/ferrocene product may be prepared separately and added subsequently to a vinyl ether monomer composition. Thus, when ferrocene and triphenylmethylhexachloroantimonate are mixed under nitrogen in dry $CH_2Cl_2$ a dark blue precipitate forms immediately. This precipitate is air stable. Analysis shows the blue precipitate to be an equimolar mixture of ferricenium tetrachloroantimonite and ferricenium hexachloroantimonate.

The counter ions of ferricenium salts have the formula $MX_n-$ where M denotes an atom of a metal or metalloid selected from antimony, phosphorus, boron, arsenic, tin, or bismuth; X is a halide, preferably fluorine or chlorine; and n is an integer equal to 1 plus the valency of M. Examples of such complex anions include $BF_4-$, $PF_6-$, $AsF_6-$, $SbF_6-$, $SnCl_5-$, $SbCl_4-$, $SbCl_6-$, etc.

An unusual aspect of the present invention is that the ferricenium salts do not initiate cure of other types of cationically curable monomers and resins, with the single apparent exception of N-vinyl carbazole and its analogs. Epoxy resins and 3,4-dimethoxystyrene are not cured by ferricenium salts.

The concentration of ferricenium salt in the inventive compositions is usefully in the range of 0.01%-5% by weight of the composition.

The invention may be illustrated by the following nonlimiting examples:

EXAMPLE 1

2.0 grams of 1,4-butanediol divinyl ether (BDVE) was poured into a 12 mm×75 mm Pyrex test tube. A weighed amount of an equimolar mixture of ferricenium tetrachloroantimonite and ferricenium hexachloroantimonate (designated Initiator A) was added to the BDVE, a stopwatch was started and the mixture stirred vigorously for a few seconds. The tube was then placed in a rack and observed. No precautions to exclude atmospheric oxygen were taken. A period of inactivity during which the viscosity of the mixture remained unchanged was followed by a rapid and violent reaction which yielded a hard insoluble material after a few seconds. The length of the induction time for a variety of reaction conditions is listed in Table 1.

TABLE 1

| BDVE, g | Initiator A, g | Induction time, sec. |
|---------|----------------|----------------------|
| 2.0     | 0.020          | 198                  |
| 2.0     | 0.010          | 235                  |
| 2.0     | 0.005          | 572                  |
| 2.0     | 0.003          | 1860                 |

EXAMPLE 2

3.0 grams of a commercially available chlorosulfonated rubber (DuPont Hypalon 20) was dissolved in 10.0 grams of BDVE. 2.0 grams of this mixture was poured into a 12 mm×75 mm Pyrex test tube, and 0.010 grams of Initiator A was added to the mixture. A stopwatch was started and the mixture was stirred for a few seconds. No precautions to exclude atmospheric oxygen were taken. After an induction time of 250 seconds during which there was no observable change in the viscosity of the mixture, a rapid and violent reaction occurred yielding a hard insoluble material.

EXAMPLE 3

1.0 gram of acetonitrile was poured into a 12 mm×75 mm Pyrex test tube, and 1.0 gram of a vinyl ether as specified in Table 2 was added. After this mixture was stirred for a few seconds, 0.010 grams of Initiator A was added and a stop watch was started. The mixture was again stirred for a few seconds. No precautions were taken to exclude atmospheric oxygen. After an induction period during which no observable change in the viscosity of the solution occurred, a rapid and violent reaction ensued followed by the formation of an oily precipitate. The precipitate was characterized as a quantitative yield of low molecular weight vinyl ether polymer.

TABLE 2

| Vinyl Ether (g) | Induction Time, Sec |
|-----------------|---------------------|
| Ethyl   (1.0)   | 354                 |
| n-butyl (1.0)   | 567                 |
| BDVE    (1.0)   | 698                 |

EXAMPLE 4

Equal amounts of acetonitrile (2.0 grams) and n-butyl vinyl ether (1.5 grams) were added to two 12 mm×75 mm Pyrex test tubes. Into both mixtures 0.010 grams of Initiator A were added with stirring for a few seconds. The first test tube was then flushed with nitrogen and sealed, while no precautions to exclude atmospheric oxygen were taken with the second test tube. The contents of the second tube underwent a violent and rapid reaction after an induction time of 10–15 minutes, while the contents of the tube sealed under nitrogen underwent a similar reaction after an induction time of 75 minutes. In both cases an oily precipitate formed.

EXAMPLE 5

1.0 gram of BDVE was poured into a 12 mm×75 m test tube, and 0.005 grams of an equimolar mixture of n-butyl ferricenium tetrachloroantimonite and n-butyl ferricenium hexachloroantimonate (Initiator B) was added and stirred for a few seconds. No special precautions were taken to exclude atmospheric oxygen. The induction time was 219 seconds. The experiment was repeated with 2.0 grams of BDVE and 0.005 grams of Initiator B. The induction time was 269 seconds.

EXAMPLE 6

2.0 grams of BDVE was poured into a 12 mm×75 mm Pyrex test tube, and 0.010 grams of an equimolar mixture of t-octyl ferricenium tetrachloroantimonite and t-octyl ferricenium hexachloroantimonate (Initiator C) was added and stirred for a few seconds. No special precautions were taken to exclude atmospheric oxygen. The induction time was 762 seconds. The experiment was repeated with 2.0 grams of BDVE and 0.005 grams of Initiator C. The induction time was 1845 seconds.

EXAMPLE 7

1.0 gram of BDVE was poured into a 12 mm×75 mm Pyrex test tube and 0.1 grams of a 1 percent solution of ferricenium hexafluorophosphate in acetonitrile was added. No special precautions were taken to exclude atmospheric oxygen. The induction time was 2260 seconds.

We claim:

1. A curable composition consisting essentially of a mixture of at least one vinyl ether monomer and a ferricenium salt represented by the formula:

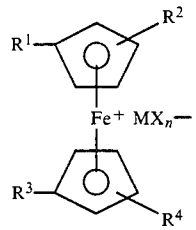

where $R^1$, $R^2$, $R^3$, and $R^4$ are the same or different H or alkyl groups or a linkage to a polymer backbone, M is a metal or metalloid; X is a halide and n is an integer equal to 1 plus the valency of M.

2. A composition in claim 1 formed by addition of a trityl salt to a composition comprising a vinyl ether monomer and a ferrocene.

3. A composition as in claim 1 wherein M is selected from arsenic, antimony, phosphorus, boron, tin or bismuth.

4. A composition as in claim 1 where X is fluorine or chlorine.

5. A composition as in claim 3 wherein MX— is selected from $BF_4$—, $PF_6$—, $AsF_6$—, $SbF_6$—, $SnCl_5$—, $SbCl_4$—, $SbCl_6$—.

6. A composition as in claim 5 wherein $MX_n$— is $SbCl_6$—, $SbCl_4$—, $PF_6$—, or mixtures thereof.

7. A composition as in claim 1 wherein the ferricenium salt is a salt of ferrocene, n-butyl ferrocene, t-octyl ferrocene, 1,1-dibutyl ferrocene or poly(vinyl ferrocene).

8. A composition as in claim 1 wherein the vinyl ether is represented by one of the formulas:

$(CH_2=CH—O—CH_2)_n—G$ $(CH_2=CH—O—C_6H_4)_n—G$ $(CH_2=CH-O-CR^1=CR^2)_n-G$ $CH_2=CH-O-C\equiv C)_n-G$ or ketene acetals such as those of the formulas:

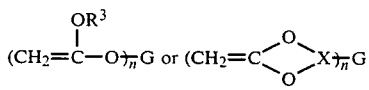

where G is a mono or multivalent radical free of groups, such as amino, substituted amino or phenol, which interfere with cationic or free radical polymerization; n is an integer greater than or equal to 1; $R^1$ and $R^2$ are selected from H, alkyl, substituted alkyl, aryl, and substituted aryl; $R^3$ is selected from alkyl, substituted alkyl, aryl, and substituted aryl; and X is a hydrocarbonyl group of 1-5 carbon atoms.

9. A method of curing a composition containing essentially of vinyl ether comprising adding alone or in a solvent a ferricenium salt of the formula:

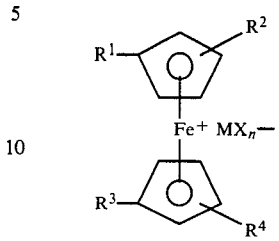

where $R^1$, $R^2$, $R^3$ and $R^4$ are the same or different H or alkyl groups or a linkage to a polymeric backbone, M is a metal or metalloid; X is a halide and n is an integer equal to 1 plus the valency of M, to said composition.

* * * * *